United States Patent
Blocksome et al.

(10) Patent No.: US 8,458,244 B2
(45) Date of Patent: *Jun. 4, 2013

(54) PERFORMING A LOCAL REDUCTION OPERATION ON A PARALLEL COMPUTER

(75) Inventors: Michael A. Blocksome, Rochester, MN (US); Daniel A. Faraj, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/585,993

(22) Filed: Aug. 15, 2012

(65) Prior Publication Data

US 2012/0317399 A1 Dec. 13, 2012

Related U.S. Application Data

(63) Continuation of application No. 12/760,020, filed on Apr. 14, 2010, now Pat. No. 8,332,460.

(51) Int. Cl.
| | | |
|---|---|---|
| *G06F 15/76* | (2006.01) | |
| *G06F 15/16* | (2006.01) | |
| *G06F 9/02* | (2006.01) | |
| *G06F 12/00* | (2006.01) | |

(52) U.S. Cl.
USPC .............................. 709/201; 712/30; 711/147

(58) Field of Classification Search
USPC ............. 709/201; 712/30, E09.002; 711/147, 711/E12.078
See application file for complete search history.

(56) References Cited

U.S. PATENT DOCUMENTS

| 4,715,032 A | 12/1987 | Nilsson |
| 4,843,540 A | 6/1989 | Stolfo |
| 5,105,424 A | 4/1992 | Flaig et al. |
| 5,333,279 A | 7/1994 | Dunning |

(Continued)

FOREIGN PATENT DOCUMENTS

| EP | 1835414 A2 | 9/2007 |
| JP | 2000156039 A | 6/2000 |
| JP | 2003036681 A * | 2/2003 |
| JP | 2003317487 A * | 11/2003 |

OTHER PUBLICATIONS

Matsuda, et al., "Efficient MPI Collective Operations for Clusters in Long-and-Fast Networks" , pp. 1-9, 2006 IEEE International Conference on Cluster Computing, Sep. 2006, IEEE.

(Continued)

*Primary Examiner* — Wing F. Chan
*Assistant Examiner* — Kostas Katsikis
(74) *Attorney, Agent, or Firm* — Biggers & Ohanian, LLP

(57) ABSTRACT

A parallel computer including compute nodes, each including two reduction processing cores, a network write processing core, and a network read processing core, each processing core assigned an input buffer. Copying, in interleaved chunks by the reduction processing cores, contents of the reduction processing cores' input buffers to an interleaved buffer in shared memory; copying, by one of the reduction processing cores, contents of the network write processing core's input buffer to shared memory; copying, by another of the reduction processing cores, contents of the network read processing core's input buffer to shared memory; and locally reducing in parallel by the reduction processing cores: the contents of the reduction processing core's input buffer; every other interleaved chunk of the interleaved buffer; the copied contents of the network write processing core's input buffer; and the copied contents of the network read processing core's input buffer.

19 Claims, 9 Drawing Sheets

U.S. PATENT DOCUMENTS

| | | | |
|---|---|---|---|
| 5,513,371 A | | 4/1996 | Cypher et al. |
| 5,535,197 A | * | 7/1996 | Cotton ............... 370/395.72 |
| 5,541,914 A | | 7/1996 | Krishnamoorthy et al. |
| 5,617,538 A | | 4/1997 | Heller |
| 5,668,815 A | | 9/1997 | Gittinger et al. |
| 5,721,828 A | | 2/1998 | Frisch |
| 5,822,604 A | | 10/1998 | Ogasawara et al. |
| 5,832,215 A | | 11/1998 | Kato et al. |
| 5,864,712 A | | 1/1999 | Carmichael et al. |
| 5,878,241 A | | 3/1999 | Wilkinson et al. |
| 5,892,923 A | | 4/1999 | Yasuda et al. |
| 5,937,202 A | | 8/1999 | Crosetto et al. |
| 5,949,988 A | | 9/1999 | Feisullin et al. |
| 5,958,017 A | | 9/1999 | Scott et al. |
| 6,000,024 A | | 12/1999 | Maddox |
| 6,038,651 A | | 3/2000 | VanHuben et al. |
| 6,067,609 A | | 5/2000 | Meeker et al. |
| 6,076,131 A | | 6/2000 | Nugent |
| 6,108,692 A | | 8/2000 | Van Seters et al. |
| 6,212,617 B1 | | 4/2001 | Hardwick |
| 6,272,548 B1 | | 8/2001 | Cotter et al. |
| 6,289,424 B1 | | 9/2001 | Stevens |
| 6,292,822 B1 | | 9/2001 | Hardwick |
| 6,334,138 B1 | | 12/2001 | Kureya |
| 6,480,885 B1 | | 11/2002 | Olivier |
| 6,634,301 B1 | | 10/2003 | Mulinix |
| 6,714,552 B1 | | 3/2004 | Cotter |
| 6,742,063 B1 | | 5/2004 | Hellum et al. |
| 6,754,211 B1 | | 6/2004 | Brown |
| 6,914,606 B2 | | 7/2005 | Amemiya et al. |
| 6,982,960 B2 | | 1/2006 | Lee et al. |
| 7,133,359 B2 | | 11/2006 | Weis |
| 7,263,598 B2 | | 8/2007 | Ambuel |
| 7,284,033 B2 | | 10/2007 | Jhanji |
| 7,352,739 B1 | | 4/2008 | Rangarajan et al. |
| 7,496,699 B2 | | 2/2009 | Pope et al. |
| 7,539,989 B2 | | 5/2009 | Blackmore et al. |
| 7,555,566 B2 | | 6/2009 | Blumrich et al. |
| 7,613,134 B2 | | 11/2009 | Rangarajan et al. |
| 7,664,110 B1 | | 2/2010 | Lovett et al. |
| 7,673,011 B2 | | 3/2010 | Archer et al. |
| 7,697,443 B2 | | 4/2010 | Archer et al. |
| 7,707,366 B2 | | 4/2010 | Tagawa |
| 7,725,329 B2 | | 5/2010 | Kil et al. |
| 7,739,451 B1 | | 6/2010 | Wiedenman et al. |
| 7,793,527 B2 | | 9/2010 | Shen |
| 7,835,378 B2 | | 11/2010 | Wijnands et al. |
| 7,853,639 B2 | | 12/2010 | Archer et al. |
| 7,856,543 B2 | * | 12/2010 | Rhoades et al. ............ 712/22 |
| 7,948,999 B2 | | 5/2011 | Blocksome et al. |
| 8,332,460 B2 | | 12/2012 | Blocksome et al. |
| 2002/0016901 A1 | | 2/2002 | Carvey et al. |
| 2002/0054051 A1 | | 5/2002 | Ladd |
| 2002/0065984 A1 | | 5/2002 | Thompson et al. |
| 2002/0091819 A1 | | 7/2002 | Melchione et al. |
| 2002/0144027 A1 | | 10/2002 | Schmisseur |
| 2003/0182376 A1 | | 9/2003 | Smith |
| 2003/0188054 A1 | | 10/2003 | Yosimoto et al. |
| 2003/0212877 A1 | | 11/2003 | Dally et al. |
| 2004/0034678 A1 | | 2/2004 | Kuszmaul et al. |
| 2004/0073590 A1 | | 4/2004 | Bhanot et al. |
| 2005/0094577 A1 | | 5/2005 | Ashwood-Smith |
| 2005/0165980 A1 | | 7/2005 | Clayton et al. |
| 2005/0243711 A1 | | 11/2005 | Alicherry et al. |
| 2006/0168359 A1 | | 7/2006 | Bissessur et al. |
| 2006/0179181 A1 | | 8/2006 | Seong |
| 2006/0277323 A1 | | 12/2006 | Joublin et al. |
| 2007/0110063 A1 | | 5/2007 | Tang et al. |
| 2007/0174558 A1 | | 7/2007 | Jia et al. |
| 2007/0242611 A1 | | 10/2007 | Archer et al. |
| 2007/0245122 A1 | | 10/2007 | Archer et al. |
| 2007/0288935 A1 | | 12/2007 | Tannenbaum et al. |
| 2008/0077366 A1 | | 3/2008 | Neuse et al. |
| 2008/0127146 A1 | | 5/2008 | Liao et al. |
| 2008/0201603 A1 | | 8/2008 | Ritz et al. |
| 2008/0301683 A1 | * | 12/2008 | Archer et al. ............ 718/102 |
| 2009/0006662 A1 | | 1/2009 | Chen et al. |
| 2009/0019218 A1 | | 1/2009 | Sinclair et al. |
| 2009/0064176 A1 | | 3/2009 | Ohly et al. |
| 2009/0067334 A1 | | 3/2009 | Archer et al. |
| 2009/0154486 A1 | | 6/2009 | Archer et al. |
| 2009/0196361 A1 | | 8/2009 | Chan et al. |
| 2009/0240838 A1 | | 9/2009 | Berg et al. |
| 2009/0292905 A1 | * | 11/2009 | Faraj ............ 712/225 |
| 2010/0122268 A1 | | 5/2010 | Jia |
| 2010/0185718 A1 | | 7/2010 | Archer et al. |
| 2011/0119673 A1 | | 5/2011 | Bloch et al. |
| 2011/0153908 A1 | | 6/2011 | Schaefer et al. |
| 2011/0179134 A1 | | 7/2011 | Mayo et al. |

OTHER PUBLICATIONS

Stolfo, et al., DADO: A Tree-Structured Machine Architecture for Production Systems, AAAI-82 Proceedings, 1982, AAAI (www.aaai.org), pp. 242-246, Columbia University.

Oh, "An All-Reduce Operation in Star Networks Using All-to-All Broadcast Communication Patterns", V.S. Sunderam et al. (Eds.): ICCS 2005, LNCS 3514, pp. 419-426, 2005, Springer-Verlag Berlin Heidelberg 2005.

Yuan, et al., "Bandwidth Efficient All-reduce Operation on Tree Topologies", IEEE IPDPS Workshop on High-Level Parallel Programming Models and Supportive Environments, 2007, pp. 1-8, IEEE.

Shrimali et al., "Building Packet Buffers Using Interleaved Memories", High Performance Switching and Routing, 2005. HPSR, May 2005, 5pp.

Edmonds, "AM++: A Generalized Active Message Framework," pp. 1-10, Sep. 2010.

Bangalore. "Extending the Message Passing Interface (MPI)", Proc. of the 1994 Conf. on Scalable Parallel Libraries, IEEE, pp. 106-118, 1995.

Bafna, "Coprocessor Design to Support MPI Primitives in Configurable Mutliprocessors;" *Integration, the VSLI Journal*, vol. 40, Issue 3, pp. 235-252, Apr. 2007.

Keller; "MPI Development Tools and Applications for the Grid," Jun. 2003, pp. 1-12.

Tang; "Optimizing threaded MPI execution on SMP clusters," *International Conference on Supercomputer*, Jun. 2001, pp. 381-392.

Sunggu, et al., "Interleaved All-To-All Reliable Broadcast on Meshes and Hypercubes", IEEE Transactions on Parallel and Distributed Systems, May 1994, pp. 449-458, vol. 5, No. 5, IEEE Xplore.

"Depth-first search—Wikipedia, the free encyclopedia", http://web.archive.org/web/20070505212029/http://en.wikipedia.org/wiki/Depth-first_search, Accessed: Apr. 29, 2009, pp. 1-5.

Bruck, et al. Efficient Algorithms for All-To-All Communications in Multiport Message-Passing Systems, IEEE Transactions on Parallel and Distributed Systems, vol. 8, Issue: 11, pp. 1143-1156, Nov. 1997, ISSN: 1045-9219.

Specification of U.S. Appl. No. 60/271,124, filed Feb. 24, 2001, pp. 12-13, 27 and 42-43.

Sistare, et al., "Optimization of MPI collectives on clusters of large-scale SMP's", Conference on High Performance Networking and Computing, Proceedings of the 1999 ACM/IEEE Conference on Supercomputing; 1999, pp. 1-18, ACM, New York, USA.

Tanenbaum, "Structured Computer Organization", 1984, pp. 1-5, Second Edition, Prentice-Hall, Inc., Englewood Cliffs, N.J., USA, ISBN: 0-13-854489-1.

Rosenberg, "Dictionary of Computers, Information Processing & Telecommunications", 1987, pp. 1-5, Second Edition, John Wiley & Sons, New York.

Herbordt, et al., "Computing Parallel Prefix and Reduction Using Coterie Structures"; Fourth Symposium on the Frontiers of Massively Parallel Computation; 1992, Oct. 19-21, 1992, pp. 141-149, IEEE Xplore.

Fisher, et al., "Computing the Hough Transform on a Scan Line Array Processor [image processing]", IEEE Transactions on Pattern Analysis and Machine Intelligence, vol. 11, Issue: 3, Mar. 1989, pp. 262-265, IEEE Xplore.

Better Explained, "Swap two variables using XOR I BetterExplained", http://betterexplained.com/articles/swap-two-variables-using-xor, Accessed Jun. 4, 2011, pp. 1-8.

Final Office Action, U.S. Appl. No. 11/769,367, USPTO Sep. 28, 2010, 14 pp.
Final Office Action, U.S. Appl. No. 12/053,842, USPTO Oct. 18, 2010, 23 pp.
Office Action, U.S. Appl. No. 12/053,842, USPTO Mar. 1, 2011, 21 pp.
Office Action, U.S. Appl. No. 11/754,740, USPTO Apr. 11, 2011, 20 pp.
Final Office Action, U.S. Appl. No. 12/124,756, USPTO Mar. 28, 2011, 19 pp.
Office Action, U.S. Appl. No. 12/503,902, Oct. 6, 2010, 09 pp.
Office Action, U.S. Appl. No. 12/060,492, May 27, 2010, 10 pp.
Final Office Action, U.S. Appl. No. 12/060,492, Dec. 2, 2010, 10 pp.
Office Action, U.S. Appl. No. 12/124,763, Oct. 14, 2010, 14 pp.
Office Action, U.S. Appl. No. 12/124,756, Oct. 18, 2010, 14 pp.
Office Action, U.S. Appl. No. 11/279,620, Mar. 4, 2008, 14 pp.
Office Action, U.S. Appl. No. 11/279,620, Sep. 3, 2008, 6 pp.
Office Action, U.S. Appl. No. 11/279,620, Dec. 29, 2008, 14 pp.
Office Action, U.S. Appl. No. 11/769,367, Apr. 3, 2009, 11 pp.
Office Action, U.S. Appl. No. 11/459,387, Dec. 13, 2007, 19 pp.
Office Action, U.S. Appl. No. 11/459,387, Jul. 11, 2008, 20 pp.
Office Action, U.S. Appl. No. 11/459,387, Mar. 18, 2009, 25 pp.
Office Action, U.S. Appl. No. 11/737,286, Feb. 9, 2009, 07 pp.
Office Action, U.S. Appl. No. 11/737,209, Jul. 20, 2009, 15 pp.
Office Action, U.S. Appl. No. 11/843,090, Sep. 4, 2009, 13 pp.
Office Action, U.S. Appl. No. 12/760,020, Feb. 13, 2012, 33 pp.
Notice of Allowance, U.S. Appl. No. 12/760,020, Jul. 30, 2012, 19 pp.
Notice of Allowance, U.S. Appl. No. 12/124,763, USPTO Oct. 3, 2012.
Final Office Action, U.S. Appl. No. 12/124,745, USPTO Nov. 23, 2012.
Office Action, U.S. Appl. No. 12/748,594, USPTO Sep. 14, 2012.
Office Action, U.S. Appl. No. 13/585,993, Oct. 11, 2012.
U.S. Appl. No. 13/672,740, filed Nov. 9, 2012.
U.S. Appl. No. 13/666,221, filed Nov. 1, 2012.

* cited by examiner

PERFORMING A LOCAL REDUCTION OPERATION ON A PARALLEL COMPUTER

CROSS-REFERENCE TO RELATED APPLICATION

This application is a continuation application of and claims priority from U.S. patent application Ser. No. 12/760,020, filed on Apr. 14, 2010.

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for performing a local reduction operation on a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

Collective operations involve data communications amongst many compute nodes and data processing within many compute nodes. In some embodiments, data communications are carried out in manner that is faster than the individual data processing carried out by each compute node. Therefore, increasing efficiency in local data processing by compute nodes when carrying out collective operations is desirable.

SUMMARY OF THE INVENTION

Methods, apparatus, and products for performing a local reduction operation on a parallel computer are disclosed. In embodiments of the present invention, the parallel computer includes a plurality of compute nodes coupled for data communications with a high speed, low latency network, the compute nodes are organized for collective operations with each compute node including at least four processing cores. Each processing core is assigned an input buffer. The processing cores include two reduction processing cores dedicated to executing reduction operations, a network write processing core dedicated to writing results of reduction operations to the network, and a network read processing core dedicated to receiving data from the network. Performing a local reduction operation on the parallel computer in accordance with embodiments of the present invention includes copying, in interleaved chunks by the reduction processing cores, contents of the reduction processing cores' input buffers to an interleaved buffer in shared memory; copying, by one of the reduction processing cores, contents of the network write processing core's input buffer to shared memory; copying, by another of the reduction processing cores, contents of the network read processing core's input buffer to shared memory; and locally reducing in parallel by the reduction processing cores: the contents of the reduction processing core's input buffer; every other interleaved chunk of the interleaved buffer; the copied contents of the network write processing core's input buffer; and the copied contents of the network read processing core's input buffer.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
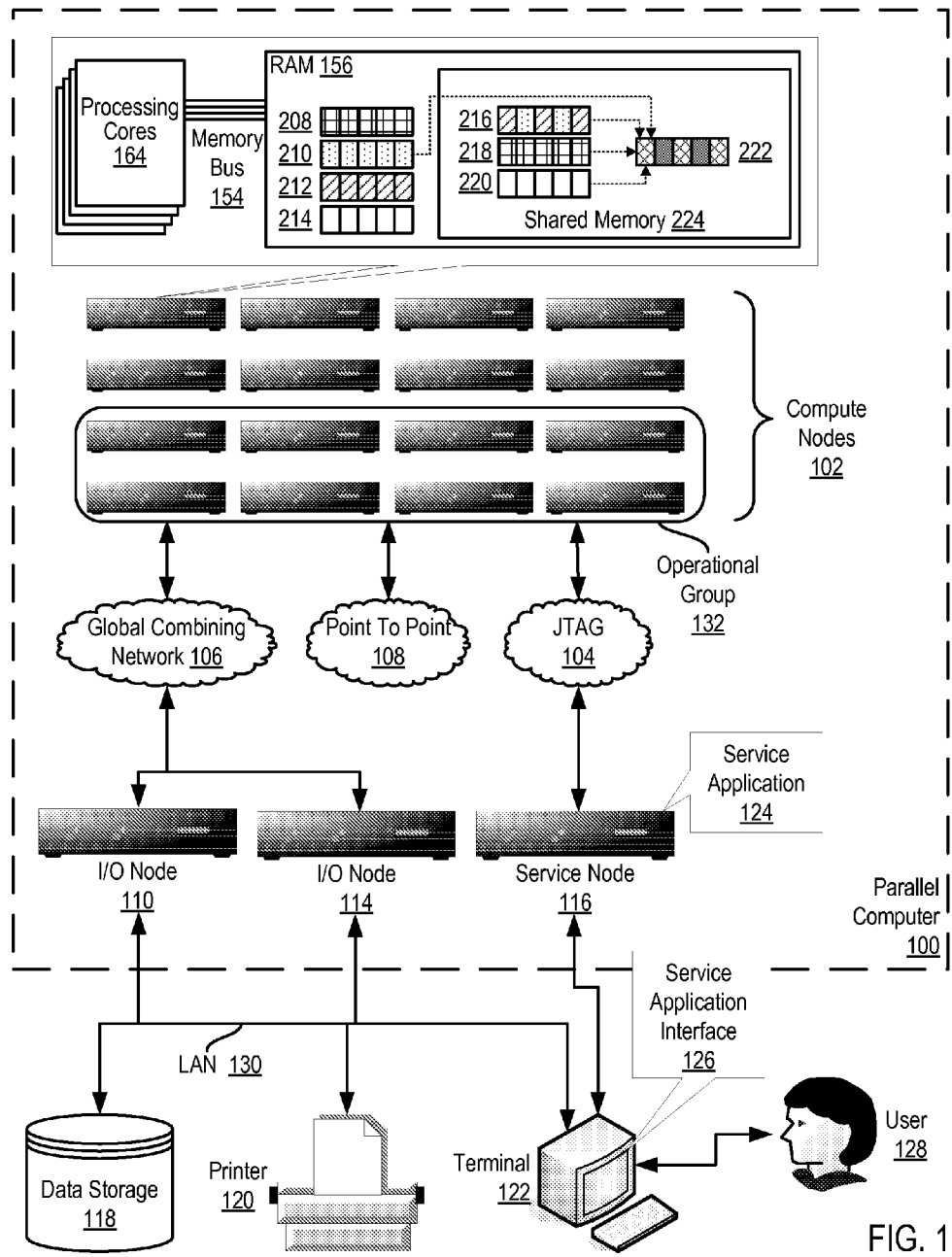
FIG. 1 illustrates an exemplary system for performing a local reduction operation on a parallel computer according to embodiments of the present invention.

Exemplary methods, apparatus, and products for performing a local reduction operation on a parallel computer in accordance with embodiments of the present invention are described with reference to the accompanying drawings, beginning with FIG. 1. FIG. 1 illustrates an exemplary system for performing a local reduction operation on a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

MPI_MAX maximum
MPI_MIN minimum
MPI_SUM sum
MPI_PROD product
MPI_LAND logical and
MPI_BAND bitwise and
MPI_LOR logical or
MPI_BOR bitwise or
MPI_LXOR logical exclusive or
MPI_BXOR bitwise exclusive or In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

The system of FIG. 1 operates generally for performing a local reduction operation on the parallel computer (100) according to embodiments of the present invention. A local reduction is a reduction of elements of a plurality of data buffers performed on one compute node rather than a collection of compute nodes. Global reduction operations, such as an 'allreduce' operation, are often carried out with many local reductions. In the example parallel computer (100) of FIG. 1 the compute nodes (102) are coupled for data communications with a high speed, low latency network (106) and the compute nodes (102) are organized for collective operations. Each compute node in the example parallel computer (100) of FIG. 1 includes at least four processing cores (164) including two reduction processing cores dedicated to executing reduction operations, a network write processing core dedicated to writing results of reduction operations to the network, and a network read processing core dedicated to receiving data from the network. Each of the processing cores (164) is assigned an input buffer (208, 210, 212, 214).

The system of FIG. 1 operates for performing a local reduction operation by copying, in interleaved chunks by the reduction processing cores, contents of the reduction processing cores' (164) input buffers (210 and 214) to an interleaved buffer (216) in shared memory (224); copying, by one of the reduction processing cores, contents of the network write processing core's input buffer (208) to a buffer (218) in shared memory (224); copying, by another of the reduction processing cores, contents of the network read processing core's input buffer (214) to a buffer (220) in shared memory (224); and locally reducing to a buffer (222) in parallel by the reduction processing cores: the contents of the reduction processing core's input buffer (208, 214); every other interleaved chunk of the interleaved buffer (216); the copied contents (218) of the network write processing core's input buffer (208); and the copied contents (220) of the network read processing core's input buffer (214).

The arrangement of nodes, networks, and I/O devices making up the exemplary system illustrated in FIG. 1 are for explanation only, not for limitation of the present invention. Data processing systems capable of performing a local reduction operation on a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers configured according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Performing a local reduction operation on a parallel computer according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of runtime optimization of an application executing on the parallel computer according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (208), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
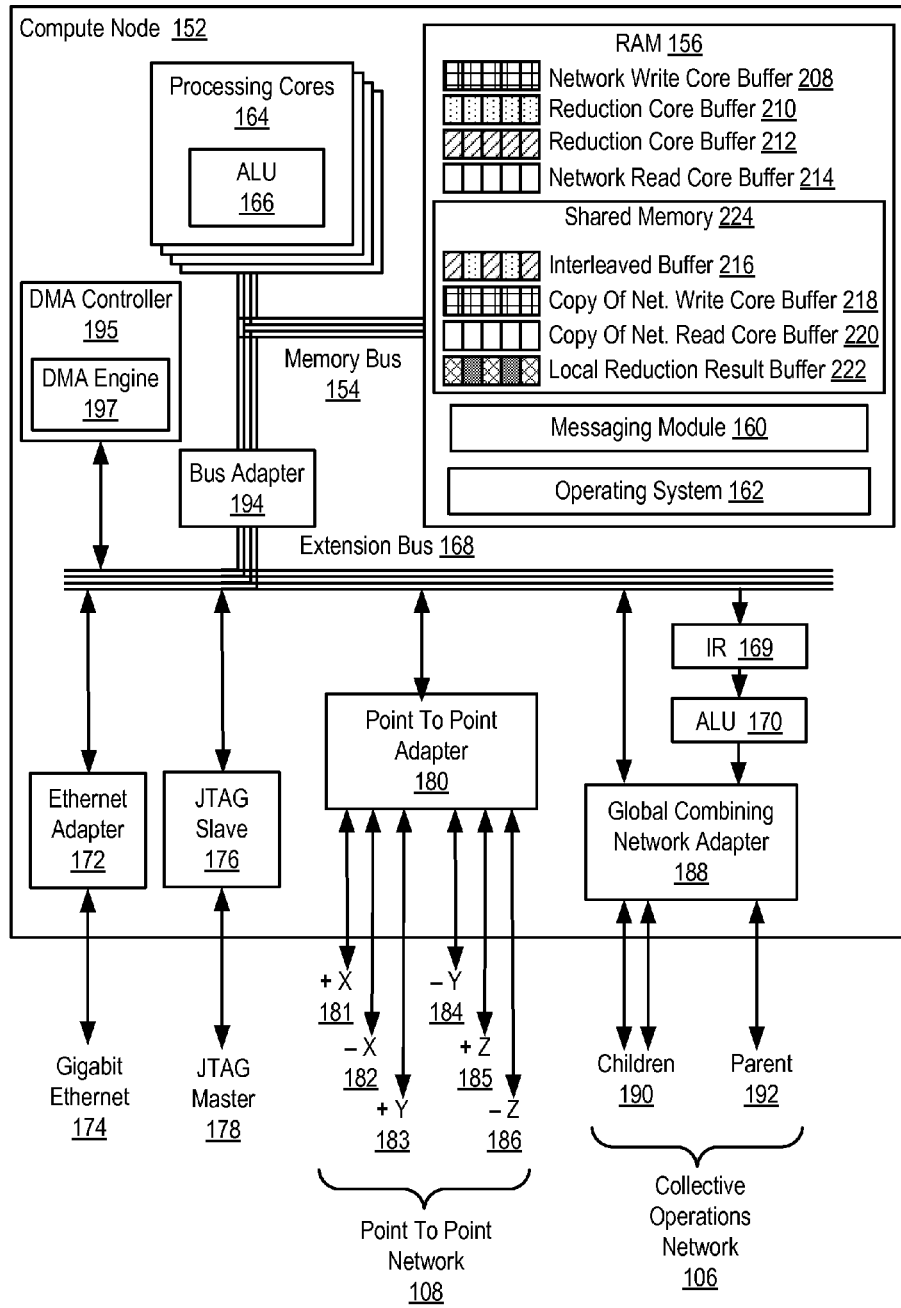
FIG. 2 sets forth a block diagram of an exemplary compute node useful in a parallel computer capable of performing a local reduction operation on the parallel computer according to embodiments of the present invention.

The messaging module (160), in the example of FIG. 2 may be modified to perform a local reduction operation on a parallel computer in accordance with embodiments of the present invention. The compute node (152) includes at least four processing cores (164), including two reduction processing cores dedicated to executing reduction operations, a network write processing core dedicated to writing results of reduction operations to the network (106), and a network read processing core dedicated to receiving data from the network (106). Each of the processing cores (164) is assigned an input buffer (208, 210, 212, 214). The messaging module (160) may perform a local reduction in accordance with embodiments of the present invention by copying, in interleaved chunks by the reduction processing cores, contents of the reduction processing cores' input buffers (210, 212) to an interleaved buffer (216) in shared memory; copying, by one of the reduction processing cores, contents of the network write processing core's input buffer (208) to a buffer (218) shared memory; copying, by another of the reduction processing cores, contents of the network read processing core's input buffer (214) to a buffer (220) shared memory; and locally reducing to a results buffer (222). in parallel by the reduction processing cores: the contents of the reduction processing core's input buffer (210, 212); every other interleaved chunk of the interleaved buffer (216); the copied contents (218) of the network write processing core's input buffer (208); and the copied contents (220) of the network read processing core's input buffer (214).

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems useful for performing a local reduction operation on a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in performing a local reduction operation on a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. The DMA engine (197) of FIG. 2 is typically stored in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
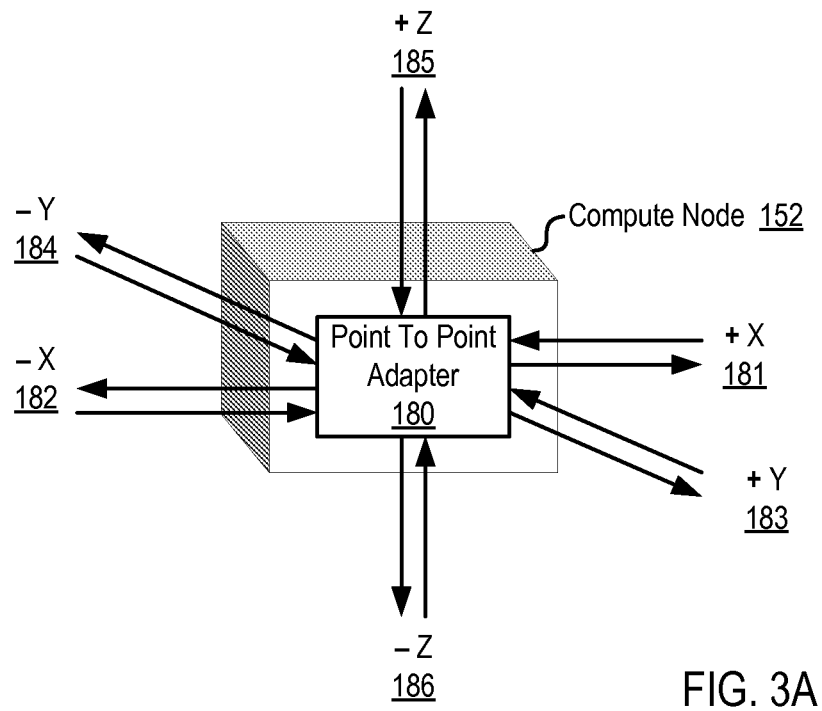
FIG. 3A illustrates an exemplary Point To Point Adapter useful in systems capable of performing a local reduction operation on a parallel computer according to embodiments of the present invention.

For further explanation, FIG. 3A illustrates an exemplary Point To Point Adapter (180) useful in systems capable of performing a local reduction operation on a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
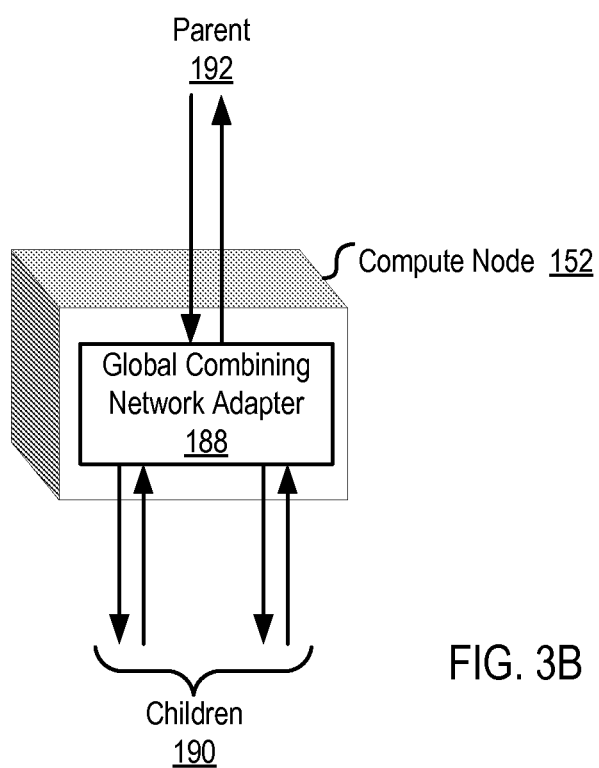
FIG. 3B illustrates an exemplary Global Combining Network Adapter useful in systems capable of performing a local reduction operation on a parallel computer according to embodiments of the present invention.

For further explanation, FIG. 3B illustrates an exemplary Global Combining Network Adapter (188) useful in systems capable of performing a local reduction operation on a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
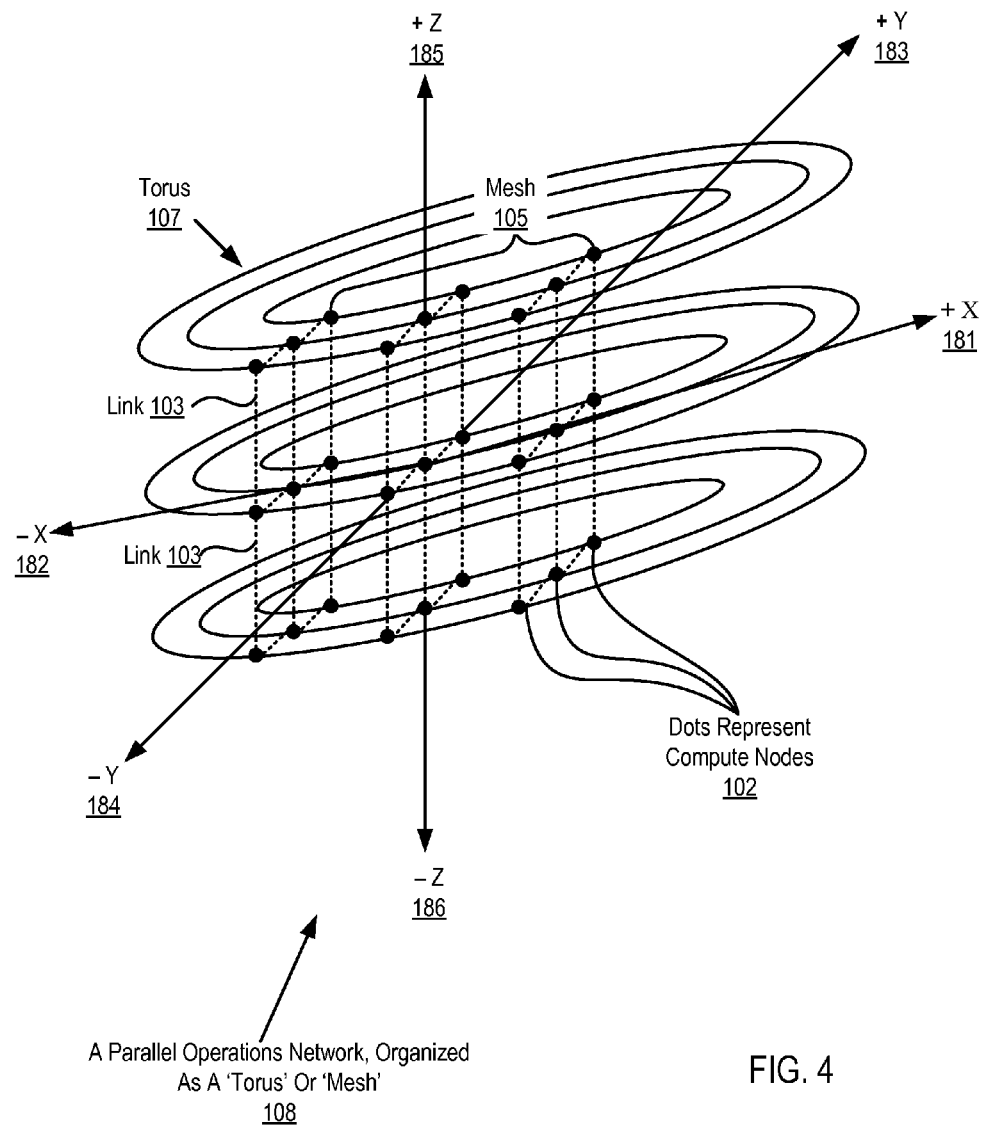
FIG. 4 sets forth a line drawing illustrating an exemplary data communications network optimized for point to point operations useful in systems capable of performing a local reduction operation on a parallel computer in accordance with embodiments of the present invention.

For further explanation, FIG. 4 sets forth a line drawing illustrating an exemplary data communications network (108) optimized for point to point operations useful in systems capable of performing a local reduction operation on a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in performing a local reduction operation on a parallel computer in accordance with embodiments of the present invention may contain only a few compute nodes or may contain thousands of compute nodes.

Figure 5:
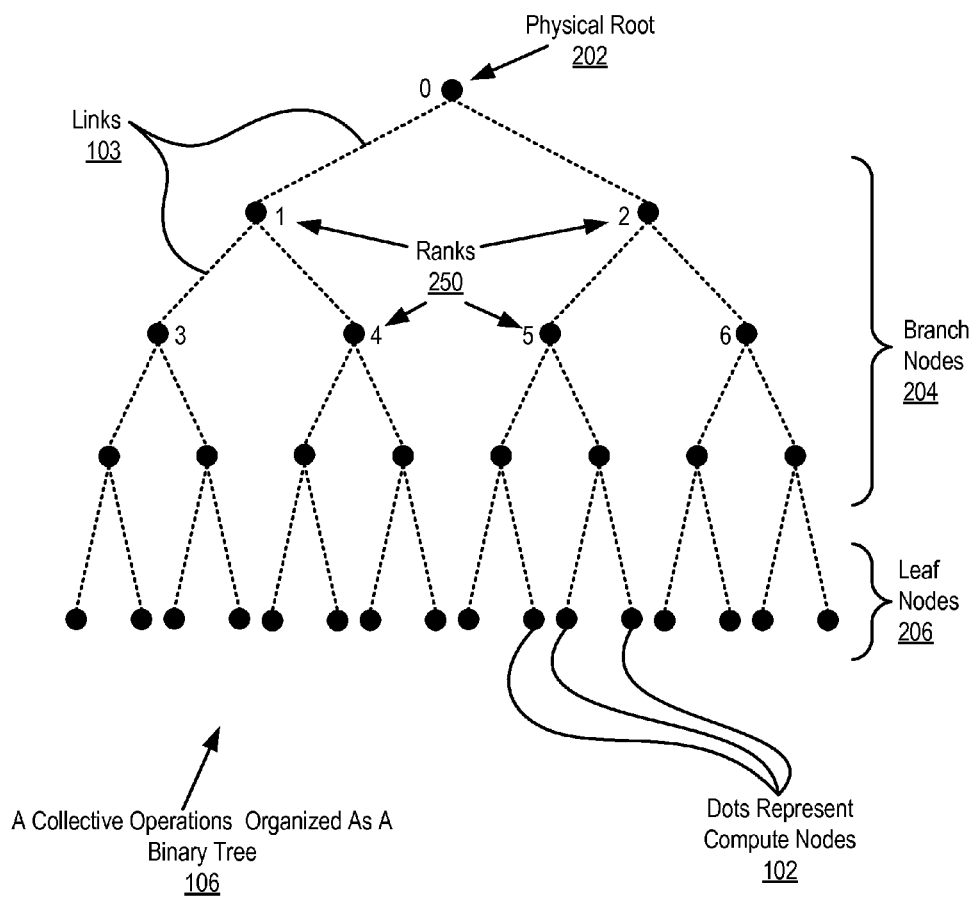
FIG. 5 sets forth a line drawing illustrating an exemplary data communications network optimized for collective operations useful in systems capable of performing a local reduction operation on a parallel computer in accordance with embodiments of the present invention.

For further explanation, FIG. 5 sets forth a line drawing illustrating an exemplary data communications network (106) optimized for collective operations useful in systems capable of performing a local reduction operation on a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems capable of performing a local reduction operation on a parallel computer in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
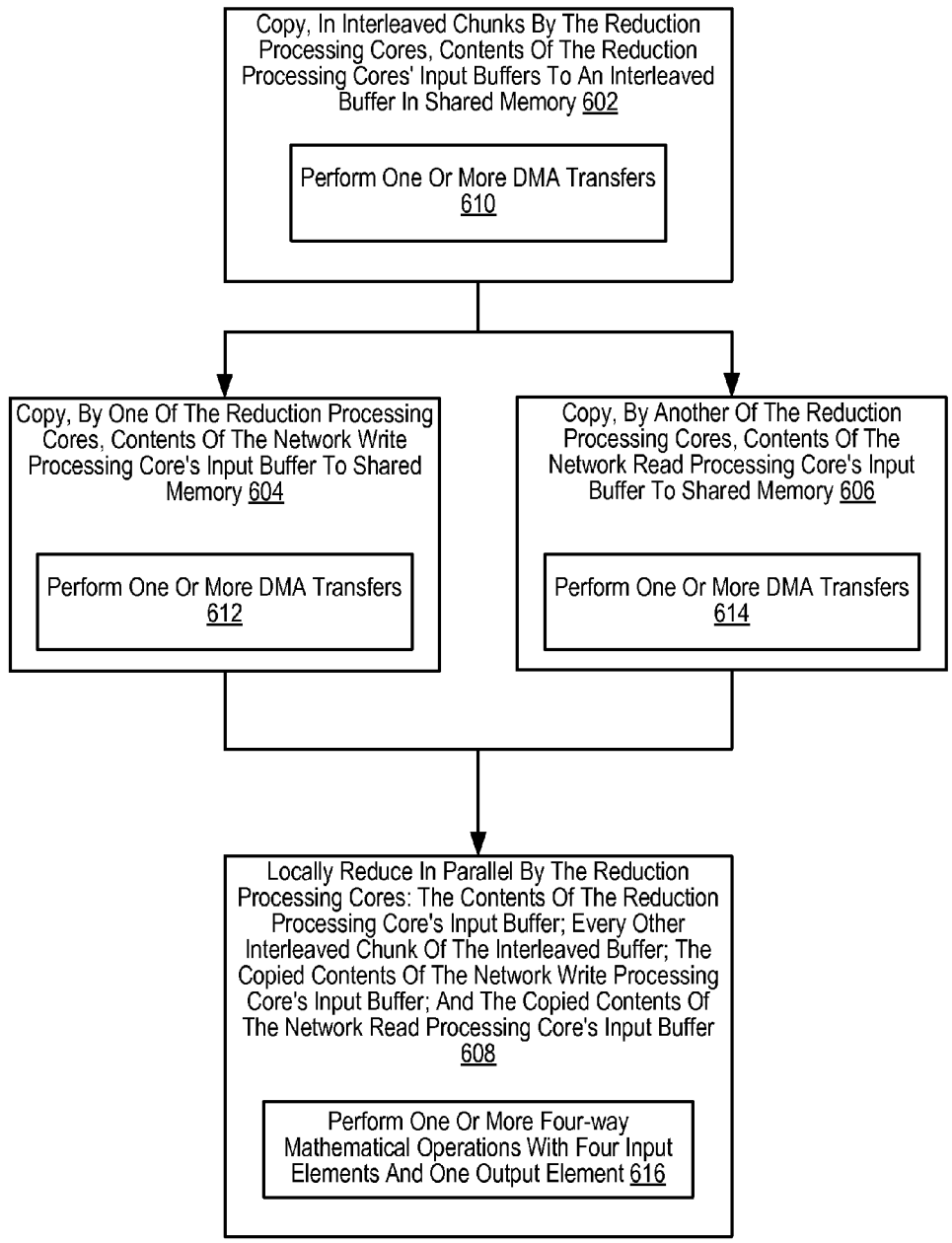
FIG. 6 sets forth a flow chart illustrating an exemplary method of performing a local reduction operation on a parallel computer according to embodiments of the present invention.

For further explanation, FIG. 6 sets forth a flow chart illustrating an exemplary method of performing a local reduction operation on a parallel computer according to embodiments of the present invention. The method of FIG. 6 may be carried out in a parallel computer similar to the parallel computer (100) of FIG. 1 with compute nodes similar to the compute node (152) of FIG. 2. The parallel computer (100) includes a plurality of compute nodes (152) coupled for data communications with a high speed, low latency network (106), the compute nodes are organized for collective operations, and each compute node includes at least four processing cores (164 on FIGS. 1 and 2). Each processing core (164) is assigned an input buffer (208, 210, 212, and 214 on FIGS. 1 and 2). The processing cores include two reduction processing cores dedicated to executing reduction operations, a network write processing core dedicated to writing results of reduction operations to the network, and a network read processing core dedicated to receiving data from the network.

The method of FIG. 6 includes copying (602), in interleaved chunks by the reduction processing cores, contents of the reduction processing cores' input buffers to an interleaved buffer in shared memory. Copying (602) contents of the reduction processing cores' input buffers to an interleaved buffer in shared memory may be carried out by performing (610) one or more DMA transfers of the data chunks stored in the input buffer to a segment of computer memory designated as shared memory. Each DMA transfer may be initiated by each reduction processing core. That is, one DMA transfer may be setup and executed at the behest of a first reduction processing core, in parallel with a DMA transfer setup and executed at the behest of a second reduction processing core.

The method of FIG. 6 also includes copying (612), by one of the reduction processing cores, contents of the network write processing core's input buffer to shared memory. Similar to the copying (602) of the contents of the reduction processors' input buffers, copying (612) contents of the network write processing core's input buffer to shared memory may be carried out by performing (612) one or more DMA transfers.

As depicted in FIG. 6, the copying (612) contents of the network write processing core's input buffer to shared memory may be carried out in parallel with copying (606), by another of the reduction processing cores, contents of the network read processing core's input buffer to shared memory. Again, such copying (606) of contents of the network read processing core's input buffer may be carried out by performing (614) one or more DMA transfers.

The method of FIG. 6 also includes, locally reducing (608) in parallel by the reduction processing cores: the contents of the reduction processing core's input buffer; every other interleaved chunk of the interleaved buffer; the copied contents of the network write processing core's input buffer; and the copied contents of the network read processing core's input buffer. In the method of FIG. 6, locally reducing (608) the contents of the reduction processing core's input buffer; every other interleaved chunk of the interleaved buffer; the copied contents of the network write processing core's input buffer; and the copied contents of the network read processing core's input buffer may be carried out by performing (616), by each reduction processor, in parallel, one or more four-way mathematical operations with four input elements and one output element. Consider, as one example of a four-way mathematical operation a summing reduction operation in which four elements are reduced to a single output element by summing the elements. Consider, as another example of four-way mathematical operation, a maximum or minimum reduction operation in which four elements are reduced to a single output element by identifying from the four elements the maximum or minimum element, respectively.

Figure 7:
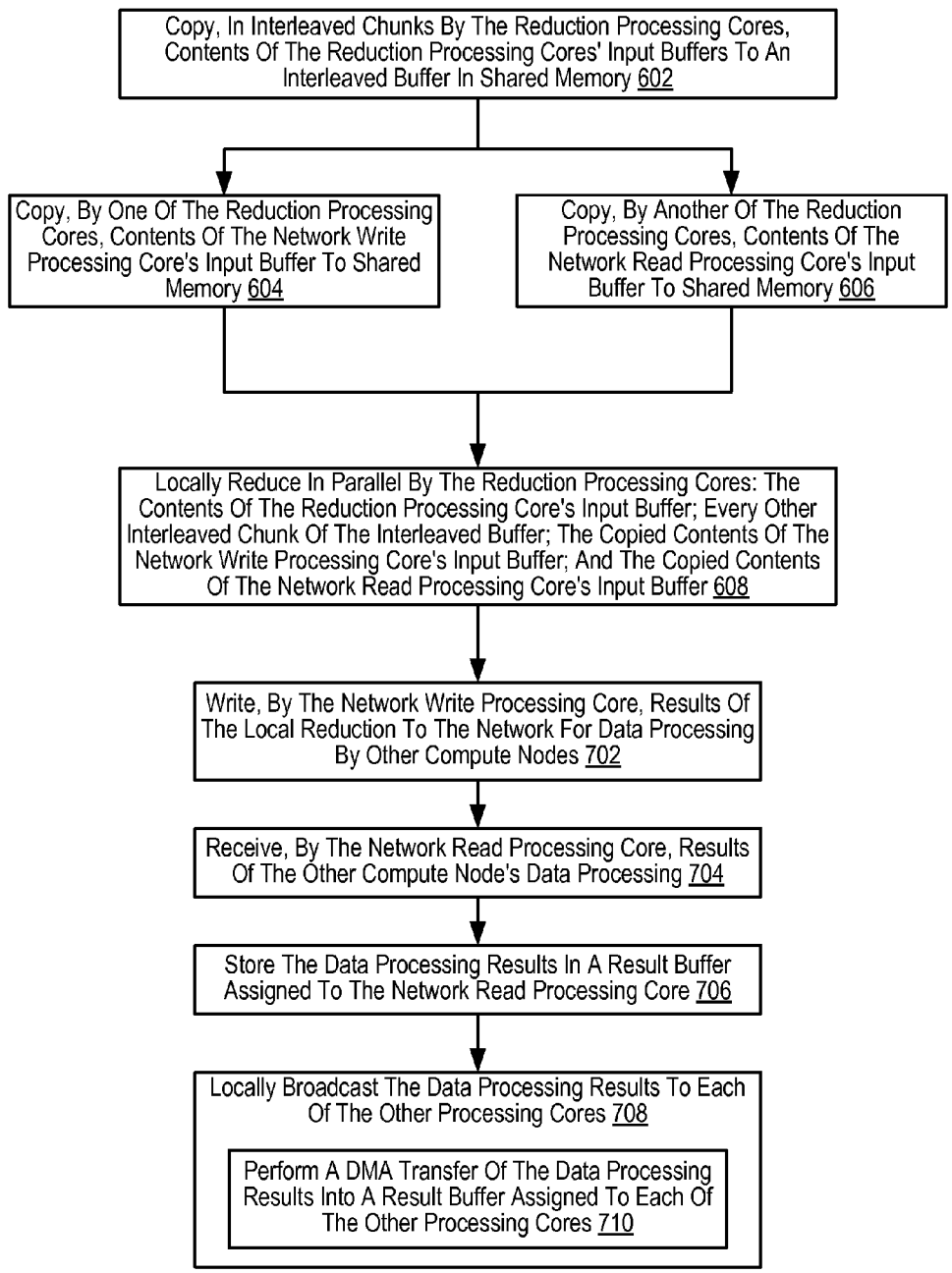
FIG. 7 sets forth a flow chart illustrating a further exemplary method of performing a local reduction operation on a parallel computer according to embodiments of the present invention.

For further explanation, FIG. 7 sets forth a flow chart illustrating a further exemplary method of performing a local reduction operation on a parallel computer in accordance with embodiments of the present invention. The method of FIG. 7 is similar to the method of FIG. 6 in that, the method of FIG. 7 may be carried out in a parallel computer similar to the parallel computer (100) of FIG. 1 with compute nodes similar to the compute node (152) of FIG. 2. The parallel computer (100) includes a plurality of compute nodes (152) coupled for data communications with a high speed, low latency network (106), the compute nodes are organized for collective operations, and each compute node includes at least four processing cores (164 on FIGS. 1 and 2). Each processing core (164) is assigned an input buffer (208, 210, 212, and 214 on FIGS. 1 and 2). The processing cores include two reduction processing cores dedicated to executing reduction operations, a network write processing core dedicated to writing results of reduction operations to the network, and a network read processing core dedicated to receiving data from the network.

The method of FIG. 7 is also similar to the method of FIG. 6 in that the method of FIG. 7 includes copying (602) contents of the reduction processing cores' input buffers to an interleaved buffer in shared memory; copying (604) contents of the network write processing core's input buffer to shared memory; copying (606) contents of the network read processing core's input buffer to shared memory; and locally reducing (608) the contents of the reduction processing core's input buffer, every other interleaved chunk of the interleaved buffer, the copied contents of the network write processing core's input buffer, and the copied contents of the network read processing core's input buffer.

The method of FIG. 7 differs from the method of FIG. 6, however, in that the method of FIG. 7 additionally includes writing (702), by the network write processing core, results of the local reduction to the network for data processing by other compute nodes. Once the results of the local reduction are written to the network, other compute nodes may perform data processing on the results, including for example, performing local reductions in accordance with embodiments of the present invention and as described in the method of FIG. 6 (steps 602, 604, 606, and 608).

Upon performing such local reductions, the other compute nodes return to the compute node carrying out the method of FIG. 7, via the high speed, low latency network, a result or many results. The method of FIG. 7 continues by receiving (704), by the network read processing core, results of the other compute node's data processing, storing (706) the data processing results in a result buffer assigned to the network read processing core, and locally broadcasting (708) the data processing results to each of the other processing cores. In the method of FIG. 7, locally broadcasting (708) data processing results to each of the other processing cores is carried out by initiating (710), by the reduction processing cores, interleaved DMA transfers of the data processing results from the result buffer assigned to the network read processing core into result buffers assigned to each of the other processing cores.

Figure 8:
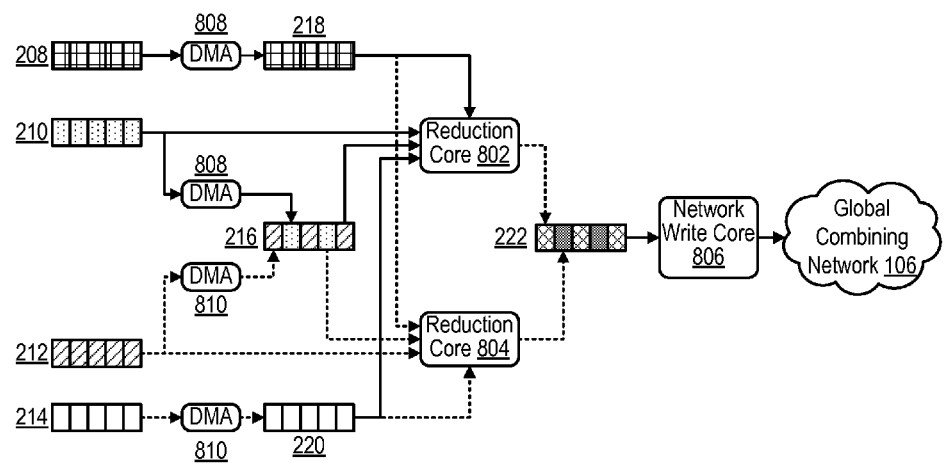
FIG. 8 sets forth an exemplary data flow diagram of a method of performing a local reduction operation on a parallel computer according to embodiments of the present invention.
Figure 9:
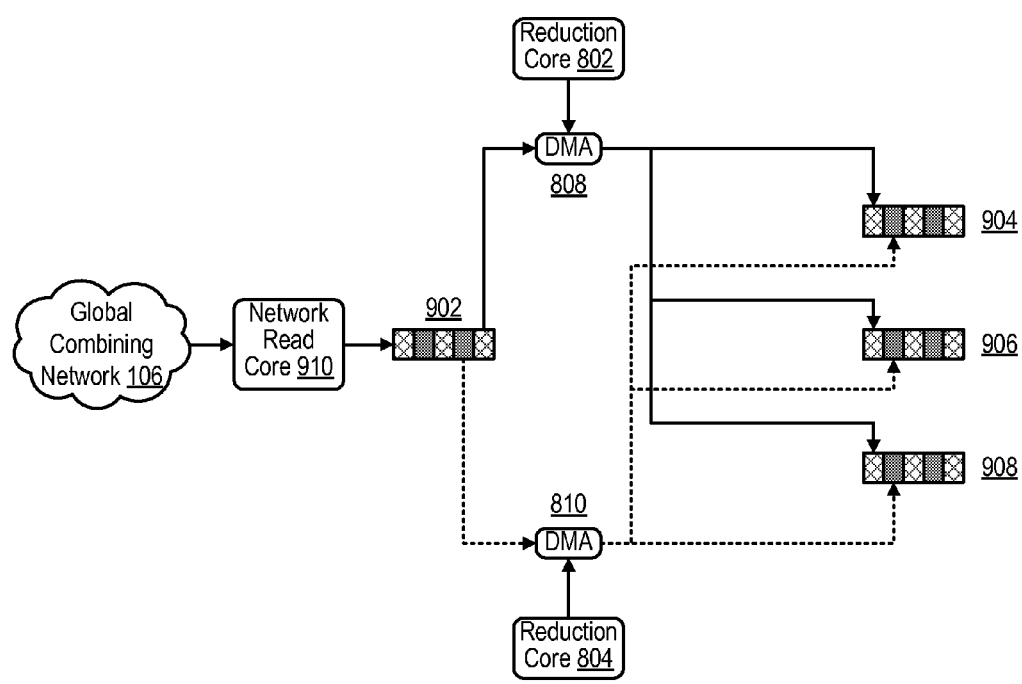
FIG. 9 sets forth a further exemplary data flow diagram of a method of performing a local reduction operation on a parallel computer according to embodiments of the present invention.

For further explanation, FIG. 8 sets forth an exemplary data flow diagram of a method of performing a local reduction operation on a parallel computer according to embodiments of the present invention. FIG. 9 also sets forth a further exemplary data flow diagram of a method of performing a local reduction operation on a parallel computer according to embodiments of the present invention. FIG. 8 illustrates data flow of a local reduction process and writing local reduction results to a high speed, low latency network in accordance with embodiments of the present invention while FIG. 9 illustrates data flow occurring after writing local reduction results to the network including data flow of receiving data processing results from the network and data flow of a local broadcast of the data processing results to processing cores.

In the example of FIG. 8, a local reduction operation is performed on a parallel computer that includes a plurality compute nodes coupled for data communications with a high speed, low latency network. The compute nodes organized for collective operations and each compute node includes at least four processing cores. In the example of FIG. 8, three of the four processing cores are illustrated including two reduction processing cores (802, 804) dedicated to executing reduction operations, and a network write processing core (806) dedicated to writing results of reduction operations to the network. Another processing core, not illustrated in FIG. 8, includes a network read processing core dedicated to receiving data from the network. In the example of FIG. 8, each processing core assigned an input buffer. In the example of FIG. 8, a reduction processing core (802) is assigned an input buffer (210), the reduction core (804) is assigned an input buffer (212), the network write processing core is assigned an input buffer (208), and the network read processing core (not shown) is assigned an input buffer (214). Each input buffer contains five elements for clarity of explanation, but readers of skill in the art will recognize that an input buffer may be of any size useful in system for performing local reductions in accordance with embodiments of the present invention.

In the example of FIG. 8, the reduction processing cores (802) copy, in interleaved chunks, contents of the reduction processing cores' input buffers (210, 212) to an interleaved buffer in shared memory through DMA transfers, utilizing DMA engines (808, 810). In this example, reduction processing core (804) performs a DMA transfer utilizing DMA engine (810) to copy a first element (far right) of the core's (804) input buffer (212) to the leftmost element of the interleaved buffer (216) while, in parallel, the reduction core (802) performs a DMA transfer utilizing DMA engine (808) to copy a first element of the core's (802) input buffer (210) to the element directly adjacent to the leftmost element of the interleaved buffer (216). In this way, reduction core (804) copies data into the first, third, and fifth elements of the interleaved buffer while reduction core (802) copies data into the second and fourth elements of the interleaved buffer (216).

Also in the example of FIG. 8, the reduction processing core (802), utilizing DMA engine (808), copies contents of the network write processing core's (806) input buffer (208) to shared memory (218) and the reduction processing core (804), utilizing DMA engine (810), copies contents of the network read processing core's input buffer (214) to shared memory (220).

From buffer (218) in shared memory, the interleaved buffer (216) in shared memory, the buffer (220) in shared memory and the reduction cores' (802, 804) input buffers, a local reduction is performed. Reduction core (802) reduces: contents of the reduction processing core's (802) input buffer (210); every other interleaved chunk of the interleaved buffer (216); the copied contents, stored in shared memory (218), of the network write processing core's (806) input buffer (208); and the copied contents in shared memory (220) of the network read processing core's input buffer (214). At the same time, that is, in parallel, reduction core (804) also reduces: contents of the reduction processing core's (802) input buffer (210); every other interleaved chunk of the interleaved buffer (216); the copied contents, stored in shared memory (218), of the network write processing core's (806) input buffer (208); and the copied contents in shared memory (220) of the network read processing core's input buffer (214).

In performing the local reduction, each reduction core (802, 804) reduces every other interleaved chunk of the interleaved buffer (216). In this way, reduction core (802), in performing the local reduction, utilizes an interleaved chunk copied from reduction core's (804) input buffer (212) while reduction core (804) utilizes an interleaved chunk copied from the other reduction core's (802) input buffer (210). By way of example, reduction core (802), in each step of the local reduction, reduces the following four elements of data: one element of the reduction core's (802) input buffer (210), one interleaved chunk representing one element of the other reduction core's (804) input buffer (212), one element of the network write processing core's (806) input buffer (208) and one element of the network read processing cores input buffer (214). Reduction core (804), in each step of the local reduction, reduces the following four elements of data: one element of the reduction core's (804) input buffer (212), one interleaved chunk representing one element of the other reduction core's (802) input buffer (210), one element of the network write processing core's (806) input buffer (208) and one element of the network read processing core's input buffer (214).

The results of the reduction are written, in an interleaved manner, to a buffer (222) accessible by the network write processing core (806). The network write process core (806) writes the results (212) of the local reduction to the network (106) for data processing by other compute nodes.

FIG. 9 also sets forth a further exemplary data flow diagram of a method of performing a local reduction operation on a parallel computer according to embodiments of the present invention. In the example of FIG. 9, the network read processing core (910) receives results of the other compute node's data processing and storing the data processing results in a result buffer (902) assigned to the network read processing core. Each of the processing cores is separately assigned a results buffer. In the example of FIG. 9, the reduction core (802) and reduction core (804) setup and initiate DMA transfers, in an interleaved manner, copying data from the results buffer of the network read processing core (910) to the results buffers (904, 906, 908) of the other processing cores. That is, the reduction processing cores (802 and 804) locally broadcast the data processing results to each of the other processing cores. The reduction cores (802) may execute DMA transfers utilizing DMA engines (808 and 810) in parallel such that the first and second element of the network read processing core's (910) result buffer (902) is copied as the first and second elements of the other result buffers (904, 906, and 908) at the same, or nearly the same time.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of performing a local reduction operation on a parallel computer, the parallel computer comprising a plurality of compute nodes coupled for data communications with a high speed, low latency network, the compute nodes organized for collective operations, each compute node comprising a plurality of processing cores, each processing core assigned an input buffer, the processing cores including two reduction processing cores dedicated to executing reduction operations, a network processing core, the method comprising:
    copying, in interleaved chunks by the reduction processing cores, contents of the reduction processing cores' input buffers to an interleaved buffer in shared memory;
    copying, by the reduction processing cores, contents of an input buffer of the network processing core;
    locally reducing in parallel by the reduction processing cores: the contents of the reduction processing cores' input buffers; every other interleaved chunk of the interleaved buffer; the copied contents of the network processing core's input buffer.

2. The method of claim 1 further comprising writing, by the network write processing core, results of the local reduction to the network for data processing by other compute nodes.

3. The method of claim 2 further comprising:
    receiving, by the network read processing core, results of the other compute node's data processing;
    storing the data processing results in a result buffer assigned to the network read processing core; and
    locally broadcasting the data processing results to each of the other processing cores including initiating, by the reduction processing cores, interleaved DMA transfers of the data processing results from the result buffer assigned to the network read processing core into result buffers assigned to each of the other processing cores.

4. The method of claim 1 wherein copying contents of the reduction processing cores' input buffers to an interleaved buffer in shared memory, copying contents of the network write processing core's input buffer to shared memory, and copying contents of the network read processing core's input buffer to shared memory further comprise performing one or more direct memory access ('DMA') transfers.

5. The method of claim 1 wherein the local reduction includes performing, by each reduction processor, in parallel, one or more four-way mathematical operations with four input elements and one output element.

6. The method of claim 1 wherein the high speed, low latency network comprises data communications links coupling the compute nodes so as to organize the compute nodes as a tree.

7. An apparatus for performing a local reduction operation on a parallel computer, the parallel computer comprising a plurality of compute nodes coupled for data communications with a high speed, low latency network, the compute nodes organized for collective operations, each compute node comprising at least four processing cores, each processing core assigned an input buffer, the at least four processing cores including two reduction processing cores dedicated to executing reduction operations, a network write processing core dedicated to writing results of reduction operations to the network, and a network read processing core dedicated to receiving data from the network, the apparatus comprising a computer processor and a computer memory operatively coupled to the computer processor, the computer memory having disposed within it computer program instructions capable of:
    copying, in interleaved chunks by the reduction processing cores, contents of the reduction processing cores' input buffers to an interleaved buffer in shared memory;
    copying, by one of the reduction processing cores, contents of the network write processing core's input buffer to shared memory;
    copying, by another of the reduction processing cores, contents of the network read processing core's input buffer to shared memory; and
    locally reducing in parallel by the reduction processing cores: the contents of the reduction processing cores' input buffers; every other interleaved chunk of the interleaved buffer; the copied contents of the network write processing core's input buffer; and the copied contents of the network read processing core's input buffer.

8. The apparatus of claim 7 further comprising computer program instructions capable of writing, by the network write processing core, results of the local reduction to the network for data processing by other compute nodes.

9. The apparatus of claim 8 further comprising computer program instructions capable of:
    receiving, by the network read processing core, results of the other compute node's data processing;
    storing the data processing results in a result buffer assigned to the network read processing core; and
    locally broadcasting the data processing results to each of the other processing cores including initiating, by the reduction processing cores, interleaved DMA transfers of the data processing results from the result buffer assigned to the network read processing core into result buffers assigned to each of the other processing cores.

10. The apparatus of claim 7 wherein copying contents of the reduction processing cores' input buffers to an interleaved buffer in shared memory, copying contents of the network write processing core's input buffer to shared memory, and copying contents of the network read processing core's input buffer to shared memory further comprise performing one or more direct memory access ('DMA') transfers.

11. The apparatus of claim 7 wherein the local reduction includes performing, by each reduction processor, in parallel, one or more four-way mathematical operations with four input elements and one output element.

12. The apparatus of claim 7 wherein the high speed, low latency network comprises data communications links coupling the compute nodes so as to organize the compute nodes as a tree.

13. A computer program product for performing a local reduction operation on a parallel computer, the parallel computer comprising a plurality of compute nodes coupled for data communications with a high speed, low latency network, the compute nodes organized for collective operations, each compute node comprising at least four processing cores, each processing core assigned an input buffer, the at least four processing cores including two reduction processing cores dedicated to executing reduction operations, a network write processing core dedicated to writing results of reduction operations to the network, and a network read processing core dedicated to receiving data from the network, the computer program product disposed in a computer readable storage medium, wherein the computer readable storage medium is not a signal, the computer program product comprising computer program instructions capable of:
- copying, in interleaved chunks by the reduction processing cores, contents of the reduction processing cores' input buffers to an interleaved buffer in shared memory;
- copying, by one of the reduction processing cores, contents of the network write processing core's input buffer to shared memory;
- copying, by another of the reduction processing cores, contents of the network read processing core's input buffer to shared memory; and
- locally reducing in parallel by the reduction processing cores: the contents of the reduction processing cores' input buffers; every other interleaved chunk of the interleaved buffer; the copied contents of the network write processing core's input buffer; and the copied contents of the network read processing core's input buffer.

14. The computer program product of claim 13 further comprising computer program instructions capable of writing, by the network write processing core, results of the local reduction to the network for data processing by other compute nodes.

15. The computer program product of claim 14 further comprising computer program instructions capable of:
- receiving, by the network read processing core, results of the other compute node's data processing;
- storing the data processing results in a result buffer assigned to the network read processing core; and
- locally broadcasting the data processing results to each of the other processing cores including initiating, by the reduction processing cores, interleaved DMA transfers of the data processing results from the result buffer assigned to the network read processing core into result buffers assigned to each of the other processing cores.

16. The computer program product of claim 13 wherein copying contents of the reduction processing cores' input buffers to an interleaved buffer in shared memory, copying contents of the network write processing core's input buffer to shared memory, and copying contents of the network read processing core's input buffer to shared memory further comprise performing one or more direct memory access ('DMA') transfers.

17. The computer program product of claim 13 wherein the local reduction includes performing, by each reduction processor, in parallel, one or more four-way mathematical operations with four input elements and one output element.

18. The computer program product of claim 13 wherein the high speed, low latency network comprises data communications links coupling the compute nodes so as to organize the compute nodes as a tree.

19. The computer program product of claim 13 wherein the computer readable storage medium comprises a recordable medium.

* * * * *